(12) United States Patent
Nugent (10) Patent No.: US 8,990,136 B2
(45) Date of Patent: Mar. 24, 2015

(54) METHODS AND SYSTEMS FOR FRACTAL FLOW FABRIC

(75) Inventor: Alex Nugent, Santa Fe, NM (US)

(73) Assignee: KnowmTech, LLC, Albuquerque, NM (US)

( * ) Notice: Subject to any disclaimer, the term of this patent is extended or adjusted under 35 U.S.C. 154(b) by 323 days.

(21) Appl. No.: 13/614,623

(22) Filed: Sep. 13, 2012

(65) Prior Publication Data

US 2013/0275358 A1    Oct. 17, 2013

(51) Int. Cl.
*G06F 17/00* (2006.01)
*H04L 12/753* (2013.01)

(52) U.S. Cl.
CPC ..................................... *H04L 45/48* (2013.01)
USPC .............................................. 706/45; 326/38

(58) Field of Classification Search
None
See application file for complete search history.

(56) References Cited

U.S. PATENT DOCUMENTS

| | | | |
|---|---|---|---|
| 5,794,224 A | 8/1998 | Yufik | |
| 5,822,721 A | 10/1998 | Johnson et al. | |
| 6,307,835 B1 | 10/2001 | Kasper | |
| 6,616,327 B1 | 9/2003 | Kearney et al. | |
| 6,889,216 B2 | 5/2005 | Nugent | |
| 6,995,649 B2 | 2/2006 | Nugent | |
| 7,028,017 B2 | 4/2006 | Nugent | |
| 7,039,619 B2 | 5/2006 | Nugent | |
| 7,107,252 B2 | 9/2006 | Nugent | |
| 7,113,931 B1 * | 9/2006 | Ugajin et al. | 706/15 |
| 7,325,123 B2 * | 1/2008 | Master et al. | 712/37 |
| 7,353,516 B2 | 4/2008 | Heidari-Bateni et al. | |
| 7,392,230 B2 | 6/2008 | Nugent | |
| 7,398,259 B2 | 7/2008 | Nugent | |
| 7,409,375 B2 | 8/2008 | Nugent | |
| 7,412,428 B2 | 8/2008 | Nugent | |
| 7,420,396 B2 | 9/2008 | Nugent | |
| 7,426,501 B2 | 9/2008 | Nugent | |
| 7,502,769 B2 | 3/2009 | Nugent | |
| 7,599,895 B2 | 10/2009 | Nugent | |
| 7,752,151 B2 | 7/2010 | Nugent | |
| 7,827,130 B2 | 11/2010 | Nugent | |
| 7,827,131 B2 | 11/2010 | Nugent | |

(Continued)

FOREIGN PATENT DOCUMENTS

EP    1 483 737 81    3/2011

OTHER PUBLICATIONS

Ababei, C.; Bazargan, K., "Non-contiguous linear placement for reconfigurable fabrics," Parallel and Distributed Processing Symposium, 2004. Proceedings. 18th International, vol., no., pp. 141,, Apr. 26-30, 2004.*

(Continued)

*Primary Examiner* — Jeffrey A Gaffin
*Assistant Examiner* — David H Kim
(74) *Attorney, Agent, or Firm* — Kermit D. Lopez; Luis M. Ortiz; Ortiz & Lopez, PLLC (57) ABSTRACT

A fractal flow fabric can include a substrate for growing at least one procedure, and a plurality of nodes formed on said substrate, wherein each node among said plurality of nodes connects to each other through at least one flow-stabilized link to grow said at least one procedure and automatically solve a problem via said at least one procedure.

18 Claims, 5 Drawing Sheets

(56) References Cited

U.S. PATENT DOCUMENTS

| | | | |
|---|---|---|---|
| 7,895,416 B2* | 2/2011 | Smith et al. | 712/220 |
| 7,930,257 B2 | 4/2011 | Nugent | |
| 7,962,716 B2* | 6/2011 | Master et al. | 712/11 |
| 8,022,732 B2 | 9/2011 | Nugent | |
| 8,041,653 B2 | 10/2011 | Nugent | |
| 2002/0169563 A1* | 11/2002 | de Carvalho Ferreira | 702/20 |
| 2003/0182246 A1 | 9/2003 | Johnson et al. | |
| 2004/0015970 A1 | 1/2004 | Scheuermann | |
| 2005/0039185 A1 | 2/2005 | Heidari-Bateni et al. | |
| 2006/0184466 A1 | 8/2006 | Nugent | |
| 2006/0195204 A1* | 8/2006 | Bonabeau et al. | 700/83 |
| 2007/0040848 A1 | 2/2007 | Hutchinson et al. | |
| 2009/0112779 A1 | 4/2009 | Wolf et al. | |
| 2010/0280982 A1 | 11/2010 | Nugent | |
| 2011/0145179 A1 | 6/2011 | Nugent | |
| 2011/0161268 A1 | 6/2011 | Nugent | |
| 2012/0062277 A1* | 3/2012 | Dalrymple et al. | 326/38 |

OTHER PUBLICATIONS

Witte, E. E.; Chamberlain, R.D.; Franklin, M.A, "Parallel simulated annealing using speculative computation," Parallel and Distributed Systems, IEEE Transactions on , vol. 2, No. 4, pp. 483,494, Oct. 1991.*

Yufik, Y. M., "Virtual Associative Networks: A Framework for Cognitive Modeling," Brian and Values: Is a Biological Science of Values Possible (1998) Lawrence Erlbaum Associates, Inc., Pribram, K. H. (ed.), Mahway, NJ, pp. 109-177.

Yufik, Y. M. et al., "Swiss Army Knife and Ockham's Razor: Modeling and Facilitating Operator's Comprehension in Complex Dynamic Tasks," IEEE Transactions on Systems, Man, and Cybernetics—Part A: Systems and Humans (2002) 32(2):185-199.

Yufik, Y. M., "How the Mind Works: An Exercise in Pragmatism," Inst. of Med. Cybern. Inc. (2002) Gaithersburg, MD, 5 pages.

* cited by examiner

METHODS AND SYSTEMS FOR FRACTAL FLOW FABRIC

CROSS-REFERENCE TO PROVISIONAL APPLICATION

This application clams priority under 35 U.S.C. 119(e) to U.S. Provisional Patent Application Ser. No. 61/625,282, entitled "Methods and Systems for Fractal Flow Fabric," which was filed on Apr. 17, 2012 the disclosure of which is incorporated herein by reference in its entirety.

TECHNICAL FIELD

Embodiments are generally related to substrates for growing procedures or algorithms. Embodiments additionally relate to fractal flow fabric methods and systems. Embodiments additionally relate to artificial intelligences and methods and systems thereof.

BACKGROUND

One of the problems with current processing and memory based computing systems is the power consumed and the communication burden. Reducing the communication burden of the system is important as it will vastly reduce the total consumed power. Also, the ability to efficiently and quickly grow effective procedures or algorithms is a much sought after feature that has yet to be implemented based on current computing paradigms and approaches. It is therefore believed that a need exists for a new approach, which reduces power consumption and the communication burden while vastly increasing speed and processing power. Such an approach is described in greater detail herein.

BRIEF SUMMARY

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is, therefore, one aspect of the disclosed embodiments to provide for method and systems for growing procedures or algorithms on a substrate.

It is another aspect of the disclosed embodiments to provide for a fractal flow fabric method and system.

It is still another aspect of the disclosed embodiments to provide an architectural layout and method thereof for implementation of a fractal flow fabric in the context of an IC chip.

The aforementioned aspects and other objectives and advantages can now be achieved as described herein. In general, a fractal flow fabric can include a substrate for growing at least one procedure, and a plurality of nodes formed on said substrate, wherein each node among said plurality of nodes connects to each other through at least one flow-stabilized link to grow said at least one procedure and automatically solve a problem via said at least one procedure. The at least one procedure can be, for example, an algorithm. Such an algorithm can be defined as an effective process/method expressible as a finite list of well-defined instructions for calculating a function that terminates before or at a predefined number of steps. Nodes among said plurality of nodes can represent steps of said algorithm. Such an algorithm can constitute a process that begins with at least one initializer node among said plurality of nodes, proceeds through a number of intermediate processor nodes among said plurality of nodes and ends with a termination node. Thus, such nodes can include, for example, at least one initializer node; at least one intermediate processor node; and at least one termination node. The aforementioned substrate can be composed of a substrate of cores, wherein each core contains said plurality of nodes. Additionally, each core among said substrate of cores can emulate, simulate and/or functionally represents one node at a time among a large set of nodes including said plurality of nodes.

A number of embodiments, preferred and alternative, are thus disclosed herein. For example, in one embodiment, a fractal flow fabric or system can be implemented, which can include a substrate for growing at least one procedure (e.g., one or more procedures), and a plurality of nodes (e.g., one or more nodes) formed on the substrate, wherein each node among the plurality of nodes connects to each other through at least one flow-stabilized link to grow the at least one procedure.

In another embodiment, the nodes can perform a probabilistic routing of data packets along the at least one flow-stabilized link. In yet another embodiment, the at least one flow-stabilized between the nodes can be modified in strength as data packets with positive or negative particles flow over the at least one flow-stabilized link. In still other embodiments, positive particles or negative particles can be emitted in an anterograde direction and proceed up the fractal flow fabric system.

In still another embodiment, positive particles or negative particles can be emitted in a retrograde direction and proceed down the fractal flow fabric system. In yet other embodiments, positive particles or negative particles can be emitted from terminal nodes among the nodes as a result of an evaluation of the at least one procedure. In other embodiments, the substrate can comprise a substrate of cores, wherein each core contains the nodes. In still other embodiments, each core among the substrate of cores can emulate, simulate or functionally represent one node at a time among a larger set of nodes. In other embodiments, the aforementioned substrate of cores can be configured via a growth process that proceeds from an initializer core and proceeds to terminal cores via a fractal tree structure.

In other embodiments, data packets containing a procedure value can be transmitted down the fractal tree structure. In still other embodiments, data packets containing procedure values of the at least one procedure can be averaged at a root core among the substrate of cores. In other embodiments, data packets projecting from a root core among the substrate of cores can include an average solution value. In still other embodiments, positive particles can be emitted from terminal cores among the substrate of cores if a value of an evolved procedure of the at least one procedure exceeds an average solution found. In yet other embodiments, the at least one procedure being evolved can comprise a fractal core configuration with respect to the substrate of cores.

In another embodiment, a fractal flow fabric or system can include, for example, a substrate for growing at least one procedure; and a plurality of nodes formed on the substrate, wherein each node among the plurality of nodes connects to each other through at least one flow-stabilized link to grow the at least one procedure, wherein the plurality of nodes performs a probabilistic routing of data packets along the at least one flow-stabilized link.

In another embodiment, the at least one flow-stabilized link between the nodes among the plurality of nodes can be modified in strength as data packets with positive or negative particles flow over the at least one flow-stabilized link. In another embodiment, positive particles or negative particles can be emitted in an anterograde direction and proceed up the fractal flow fabric system. In still another embodiment, positive particles or negative particles can be emitted in a retrograde direction and proceed down the fractal flow fabric system. In other embodiments, positive particles or negative particles can be emitted from terminal nodes among the plurality of nodes as a result of an evaluation of the at least one procedure. In another embodiment, the substrate can comprise a substrate of cores, wherein each core contains the plurality of nodes.

In still another embodiment, a method of forming a fractal flow fabric, can be implemented. Such a method can include the steps or logical operations of, for example, providing a substrate for growing at least one procedure; forming a plurality of nodes on the substrate; and connecting each node among the plurality of nodes to each other through at least one flow-stabilized link to grow the at least one procedure. In another embodiment, a step can be implemented for configuring the plurality of nodes to perform a probabilistic routing of data packets along the at least one flow-stabilized link. In still another embodiment, the at least one flow-stabilized link between the nodes among the plurality of nodes can be modified in strength as data packets with positive or negative particles flow over the at least one flow-stabilized link.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A Fractal Flow Fabric (FFF) is a substrate for growing algorithms or procedures. A procedure is an algorithm, which we will define as effective method expressed as a finite list of well-defined instructions for calculating a function that terminates before or at a pre-defined number of steps. Nodes represent the steps of the algorithm and the links between nodes represent the transitions between the steps. An algorithm is a process that starts with an initializer node, proceeds through a number of intermediate processor nodes, and ends with a termination node.

Figure 1:
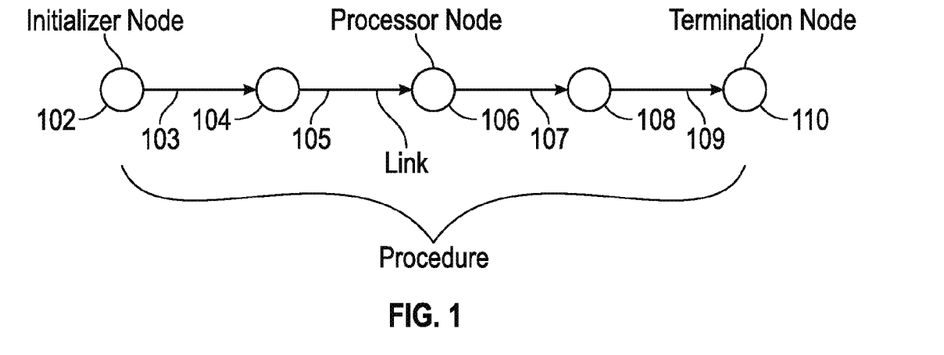
FIG. 1 illustrates a schematic diagram of a procedure or algorithm formed from a number of nodes representing steps, connected to each other via links, in accordance with the disclosed embodiments.

FIG. 1 illustrates a schematic diagram of a procedure 100 formed from a number of nodes representing steps, connected to each other via links, in accordance with the disclosed embodiments. The procedure 100 shown in FIG. 1 generally includes an initializer node 102 whose output is fed via link 103 to a processor node 104 whose output is in turn submitted to a processor node 106 via link 105. This may continue for a number of steps until the output is provided to the input of a termination node 110 via link 109. Links 103, 105, 107 and/or 109 can be configured to function as flow-stabilized links to form the procedure 100. As shown in FIG. 1, a procedure can be formed from a number of nodes representing steps, connected to each other via links. The procedure generally includes an initializer node 102, any number of intermediate processor nodes (e.g., 104, 106, 108) and a termination node 110.

The purpose of the FFF is to grow effective procedures to solve a problem. As anybody who has attempted to solve problems can attest, mistakes are common and unavoidable by-products of the search process. Stated differently, many ineffective methods are evaluated in the search for an effective method. Seen in this light, FFF is a structure that allow for the efficient search of effective procedures via the generation of many ineffective procedures. Some effective methods are better than others. That is to say, many procedures exist for solving problems but often there are only a handful of really good or optimal solutions.

Figure 2:
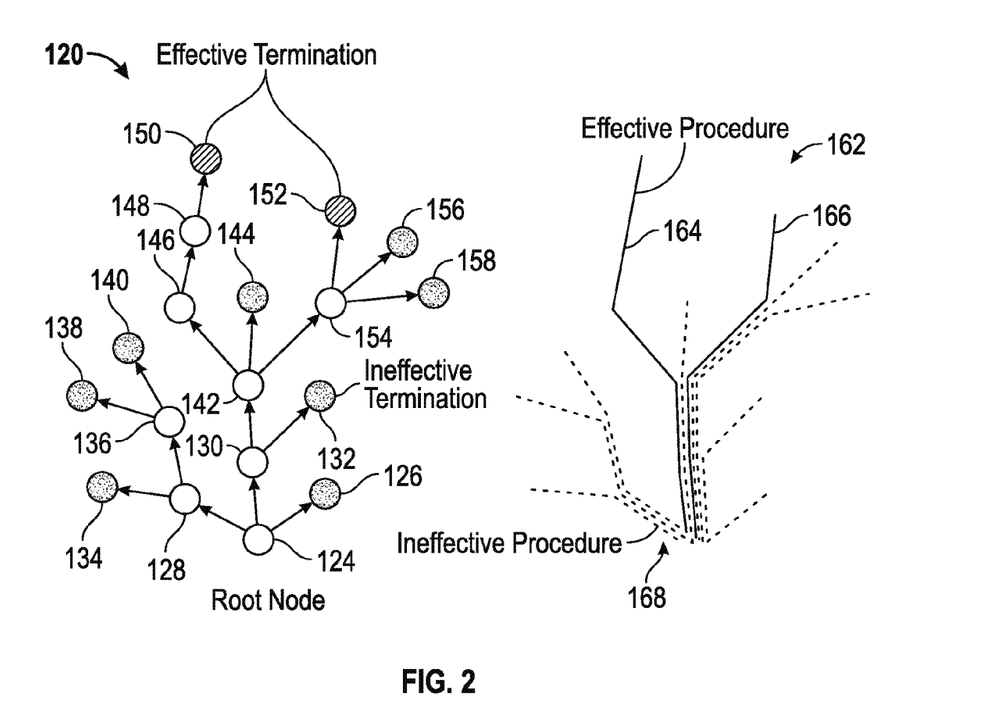
FIG. 2 illustrates a schematic diagram depicting the growth of procedures seen as a branch tree structure, in accordance with the disclosed embodiments.

FIG. 2 illustrates a schematic diagram depicting the growth of one or more procedures seen as branch tree structures 120 and 162, in accordance with the disclosed embodiments. The tree structure 120 depicted in FIG. 2 includes a plurality of nodes 124, 126, 128, 130, 132, 134, 136, 138, 140, 142, 144, 146, 148, 150, 142, 154, 156, and 158. Node 124 constitutes a root node or initializer node (e.g., such as node 102 shown in FIG. 1). In the example shown in FIG. 2, nodes 126, 132, 134, 138, 140, 144, 156 and 158 constitute ineffective termination nodes, while nodes 150 and 152 constitute effective termination nodes. These pathways are reflected in the tree structure 162 located to the right of tree structure 120. Tree structure 162, which is associated with tree structure 120 shows pathways 168 as dashed lines, which represent an ineffective procedure. On the other hand, the solid pathways 165, 166 depicted in tree structure 162 graphically represent an effective procedure.

FFF offers a generic and scalable way to search the space of procedures to find good procedures, using the memory of prior procedures to inform the selection of future procedures. Rather than a brute force solution, which attempts every permutation until a solution is found, an FFF locks onto problem sub-structure and focuses its search to speed up the time-to-solution. Before we can explain how it does this, let us first recognize that evaluating the space of all possible procedures can be represented as a tree of steps, where some procedures share common pre-cursor steps but then branch off from each other, all procedures share a common root step, and each procedure has a unique termination node, as can be seen in schematic diagram of branch tree structures 120 and 162 depicted in FIG. 2.

An FFF is a structure that allows for the growth and pruning of one or more Fractal Flow Trees. Stated another way, a FFF is a substrate that allows for the creation and destruction of nodes, where nodes represent steps in a procedure. Since the total search space of procedures of any significance is astronomically large, with vastly more procedures than the number of particles in the observable universe, it is not possible to represent every node of every procedure in the solution-tree of an FFF. We must therefore find ways to only explore a small subset of pathways at any given time, and we must intelligently direct the growth of the procedures so that a solution can be found without having to test every possible procedure. The mechanism that is employed to do this is link-flow-selection.

Figure 3:
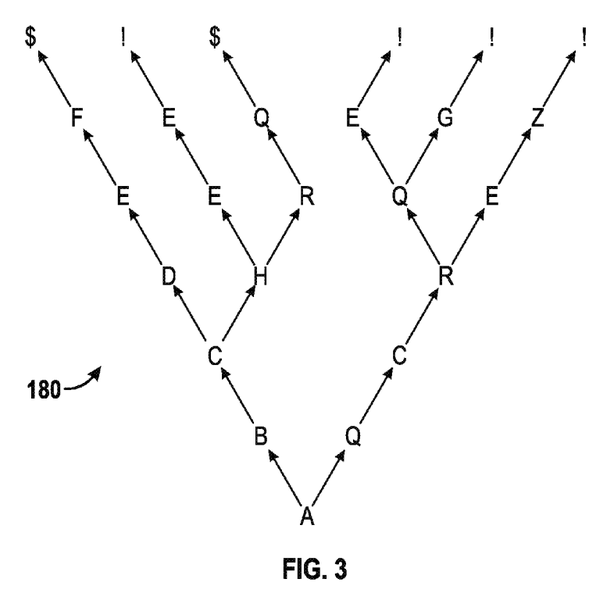
FIG. 3 illustrates a schematic diagram indicating an example scenario of six procedures, two effective and four ineffective, in accordance with the disclosed embodiments.

FIG. 3 illustrates a schematic diagram indicating an example scenario 180 of six procedures, two effective and four ineffective, in accordance with the disclosed embodiments. Let us represent a procedure as a series of operations A>B>C>, etc, where A, B and C represent algorithmic operations picked from a set of possible algorithmic operations. Let us represent an effective procedure as one that terminates with a dollar sign "$" and an ineffective procedure as one that terminates as an exclamation mark "!". As can be seen in FIG. 3, the two effective procedures share the root procedure A>B>C, while all the procedures that share the root A>Q>C>R were infective. We could generalize this result to say that procedures that start with A>Q>C>R are unlikely to be effective, while procedures that start with A>B>C are likely to be effective.

What we desire is a mechanism whereby the FFF can remember the paths of generally ineffective procedures so as to avoid taking the path again in the future, while at the same time biasing its growth of new procedures in a direction of generally effective procedures. The FFF accomplishes this through the exchange of particles between the nodes of the procedures, mediated by particle interactions between particle types and the pathways or links between the nodes of the procedure. A number of possible interactions exist, with many particle types and many emitters. As an example, let us define positive and negative particles such that positive particles flowing over a link increase the probability that a link is traversed in the future while negative particles flowing over a link decrease the probability of traversing the link in the future. Let us further suppose that initializer or termination nodes, or both, may emit positive or negative particles or both and that effective terminations emit positive particles and ineffective nodes emit negative particles.

TABLE 1

| Antero | Retro | Description |
|---|---|---|
| + | + | Search is biased toward prior attempts and past success. |
| + | − | Search is biased toward prior attempts and away from prior failures |
| + | 0 | Search is biased toward prior attempts |
| − | + | Search is biased away from prior attempts and toward prior success. |
| − | − | Search is biased away from prior attempts and away from prior failures. |
| − | 0 | Search is biased away from prior attempts |
| 0 | + | Search is biased toward prior success. |
| 0 | − | Search is biased away from prior failure |
| 0 | 0 | Search is unbiased. |

As can be seen in Table 1 above, a number of particle-emitter configurations exist, and each offers unique search capabilities. Indeed, we have not listed all the possibilities, since we have restricted the case to effective procedures emitting positive particles and ineffective procedures emitting negative particles. It could be the case that an ineffective procedure emits a retrograde positive particle, but this would lead to questionable search characteristics like attempting infective procedures repeatedly.

A number of extensions to the above configurations exist at the expense of complexity. For example, we could not limit the emission of particles to only the initializer or terminal nodes, but the processing nodes as well. We could have multiple types of positive and negative particles, each emitted under different conditions and each linked with various goal-states. The particles could react with each other, for example a positive and negative particle annihilating each other. It is clear that a virtually unlimited number of particle-flow combinations could exist, each offering unique modifications to the procedure search process.

It may be desirable to alter the particle flow configuration over time depending on the context, or to create different FFF's with different particle emitter configurations. For example, suppose that the FFF was evolving motor control procedures for a robot. Further suppose two contexts. In the first context, the robot has no work to do and has free time, and this is a good time to explore new configurations. This would entail anterograde emission of negative particles, as this will inhibit the exploration of prior procedures, moving the robot away from previously attempted solutions. At the same time, we want to prevent the robot from exploration of bad procedures, for example stepping on its own foot or hitting its self, which would require retrograde negative flow should such an unfortunate procedure be expressed. In such a way we could create an "explorer" robot. As another example robot, we could have an anterograde-positive and retrograde-positive configuration. This would keep the robot from exploratory behavior while biasing it toward prior-successful attempts. Once the robot has found an effective solution, it will do it repeatedly and "get stuck" in the solution. If we wanted the robot to do the same procedure over and over again, this would be an ideal configuration.

It can thus be appreciated that changing the FFF configurations over time would be advantageous. A young robot could explore its space with the first configuration while an old robot could settle into an effective procedure with the second configuration. Adjusting the relative strength of emitters could attain a gradual transition between the configurations. A sharp transition could also be advantageous. Keeping with the robot example, suppose that the robot performs a procedure that ended particularly badly, perhaps with a serious injury. In this case we would want the robot to retreat as quickly as possible to a safe place. We would thus want to heavily bias new procedures away from prior procedures (e.g., because they just led to an injury) while heavily biasing toward prior successful procedures, which would initiate the retreat.

Figure 4:
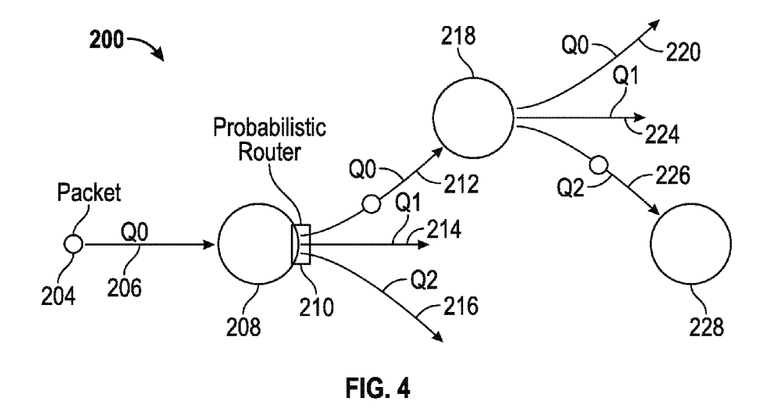
FIG. 4 illustrates a schematic diagram of nodes acting as probabilistic routers and communicated via data packets, in accordance with the disclosed embodiments.

A FFF can be built or configured from a substrate of cores. Each core contains many nodes. The function of a core is to emulate, simulate or otherwise functionally represent one node at a time out of a larger set of nodes. For brevity we will say that a core simulates nodes, but we recognize that a physical processor such as an ASIC may be built that performs the operations directly without the software-hardware duality. A small set of cores can simulate many nodes. All state variables for each node can be stored within the core. A core could be built from, for example, a CPU and memory blocks executing programs or physically adaptive ASIC hardware modifying physical connections formed of memristors. To fully understand a core we must understand all the functions of a node. FIG. 4 is helpful to understanding the concept of a node.

FIG. 4 illustrates a schematic diagram of representative nodes 200 seen as probabilistic routers 210, in accordance with the disclosed embodiments. In the illustrative example depicted in FIG. 4, a packet 204 can be transmitted via a link 206 or Q0 to the node 208. Data from the probabilistic router 210 can be distributed via links 212, 214, 216 (respectively, also Q0, Q1, Q2). The packet direction is probabilistically chosen to travel along link 212 to node 218 and then node 228 along link 226 (Q2). Links 220 and 224 (respectively, Q0 and Q1) also emanate from node 218.

A Node's function is thus to take input from a node and produce a directed output targeting another node in the virtual node-tree. The exceptions to this are initializer and termination nodes. Most abstractly, as is applicable to nodes implemented in a CPU-core architecture capable of running arbitrary programs, a node must take an input packet P and choose one of N basic operators to apply to the input. The choice of operators determines the node, which next receives the modified packet. Each node must therefore possess a finite list of operators, which it can apply to the input packet. This list of operators may differ as a function of the nodes depth in the node-tree, as a function of the state of the input packet, or even as a function of one or more external variables.

A node's function is to process a packet, which contains within it at least three items of information. First, a packet contains information relating to current state of the procedure, which consists of a list of operators, $Q_{t=0}, Q_{t=1}, \ldots, Q_{t=N}$, where N is the position of the node within the procedure. Stated differently, the current state of the procedure can be given as $Q_N(Q_{N-1}(Q_{N-2}(\ldots(Q_0(I)))))$, where I is the state of the initializer node. This list of operators defines the node. That is, a node will be active only for procedures that exactly match this order of operators. The function of the node is to decide which operator to apply to the current packet state, and forward the packet to a unique node defined by this new packet state.

Second, a packet may contain a particle type, which influences the links over which it traverses. The links to other nodes represent operators, which can be applied via traversal of the link. These links are represented in the nodes probabilistic routing table. A routing table R can be represented as an ordered list of operators and probabilities: $R=[Q_0, P_0], [Q_1, P_1], \ldots, [Q_M, P_M]$, where M is the total number of operators available to the node and $$\sum_{i=0}^{M} P_i = 1.$$

When a packet containing a positive particle traverses a link, it modifies the routing table to increase the probability of subsequent traversals. Many such mathematical methods exist for updating the routing table probabilities. As an example, let us suppose that the kth operator was chosen. The routing table probabilities could be updated according to equation (1) as follows:

$$\Delta P_{i=k} = \phi(\text{sign}(\gamma) - P_k) \qquad (1)$$
$$\Delta P_{i \neq k} = \frac{-\Delta P_{i=k}}{M-1}$$

In equation (1) above, sign($\gamma$) is +1 if the particle $\gamma$ is positive and −1 if it is negative, and $\phi$ is a constant. Third, a packet may contain initialization information. This information can be employed by the receiving node to initialize its state if it has not yet been activated by a prior procedure.

An alternative method can be implemented for evolving the routing tables, which, if implemented as a physical device, is quite efficient. Rather than assigning a probability to each operator we may presume that only a set number, say two, operators will be evaluated at any one time. These operators can be encoding in thermodynamic memory, which consists of a number of thermodynamic bits. A thermodynamic bit is a volatile bit with a probability of state flipping proportional to the bits stored energy. Thermodynamic bits may be built from memristors, for example, where the bits magnitude is related to the probability of the bit flipping its state.

Most generally, a thermodynamic bit can be constructed from two competing volatile energy-dissipating pathways, A and B. If A>B we may say the bit is "1" whereas if A<B we may say the bit is "0". In the case of memristors we are speaking of the device conductance. The application of positive feedback reinforces the thermodynamic bits state, while the application of negative feedback damages the state. Using thermodynamic bits, we may simply arrange the bits into two or more rows, where each row encodes an operator. As positive particles flow over the thermodynamic bits, they are reinforced. This would occur, for example, during the retrograde transmission of positive particles. If a thermodynamic bit does not receive feedback it cannot stabilize and will mutate into another configuration representing another operator. In such a way, the good solutions are stabilized while the poor solutions are discarded for new solutions.

As a practical example of a problem solvable with FFF, consider the traveling salesman problem, which aims to find the shortest path between a numbers of cities without visiting the same city twice. Programming the FFF would entail compiling information about the available distances between various cities. This information is contained in the initialization information, which is passed from the initializer node to the branch nodes. Since nodes are contained within cores, this information does not actually have to be stored at the node level, but rather could be stored at each core and shared by the nodes occupying the core. Furthermore, to speed up execution, we could imagine that the initialization information was shared between all cores prior to the start of procedure growth. In addition to the city distance, information relating to how this information is used to construct the operator list for the routing table must be given. This may be program code if the core is a CPU or it may be a programmable hardware bit-stream if the core is configurable hardware. For example, the input packet to a node will contain information on the current path being evaluated, which will consist of an ordered list of cities $C_0, C_1, \ldots, C_N$. To construct the list of available operators, the node must produce a list of available next steps. The list of available next steps is simply those cities that directly connect to city $C_N$. Given this list, a routing table may be constructed. Unless otherwise specified in the initialization routines, the routing table can be initialized into a state where each path is equally likely. That is, $$\Delta P_i = \frac{1}{M}.$$

Through evaluation of procedures, the routing tables will be modified to reflect routing probabilities that deviate from this symmetric starting condition. Our next step is to specify the conditions for the release of retrograde particles. Once simple example would be the release of a negative particle if the procedure has resulted in a dead-end. This would occur, for example, if no paths were available to cities that were not yet visited. A positive particle could be released under a variety of conditions, for example if an effective procedure (path through the cities) was found that was shorter than some pre-set value. Alternately, a positive particle could be released if the path was shorter than the shortest path discovered, or shorter than the average solution.

As an alternative, a positive particle could be released if the path was less than some value, which was gradually decreased over time. Finally, positive particles could be released with a magnitude inversely proportional to the path distance. Likewise, negative particles could be released under essentially the same conditions, only with the opposite threshold. That is, negative particles could be released if the path length exceeded a value, for example the current average path length. It can be appreciated that many methods exist for the release of particles and that greater communication between the terminal nodes facilitates more methods at the expense of energy consumed during communication. With this in mind, let us discuss possible core architectures that minimize communication distance while maximizing core utilization.

Figure 5:
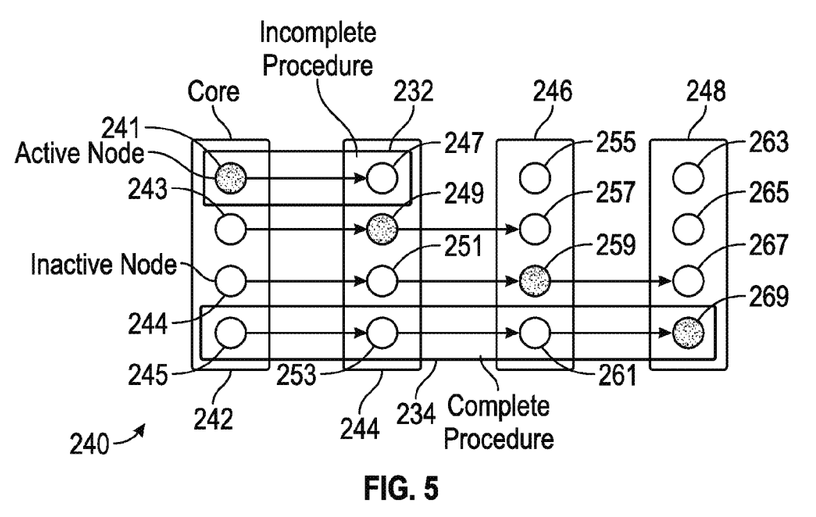
FIG. 5 illustrates a block diagram of nodes virtualized within cores and organized in a physical architecture, in accordance with the disclosed embodiments.

FIG. 5 illustrates a block diagram of example nodes virtualized within cores and organized in a physical architecture of an FFF 240 on a chip (e.g., IC chip), in accordance with the disclosed embodiments. In the example depicted in FIG. 5, cores 242, 244, 246 and 248 are shown. Core 242 includes a set of nodes 241, 243, 244, and 245. Core 244 includes a set of nodes 247, 249, 251 and 253. Core 246 includes a set of nodes 255, 257, 259 and 261. Core 248 includes a set of nodes 263, 265, 267, and 269. In the particular scenario shown in FIG. 5, core 241 is shown as an active node, and node 255 is indicated as being an inactive node. Block 232 shown in FIG. 5 represents or indicates an incomplete procedure, whereas block 234 represents a complete procedure. The incomplete procedure represented by block 232 in FIG. 5 is analogous or similar to the ineffective procedure 168 (i.e., the dashed lines/pathways) shown in FIG. 2. Similarly, the complete procedure 234 shown in FIG. 5 is analogous or similar to the effective procedure indicated by pathways/lines 164, 166 in FIG. 2.

In general, each core can contain a set of nodes. At each time step a core is responsible for simulating the operation of one of the nodes contained within it. As an example, if the core was small it could contain 256, 512 or 1024 nodes. Larger cores could contain many thousands or potentially millions of nodes. Since the number of simultaneous procedures that can be evaluated is proportional to the number of cores, it would be advantageous to have many cores. As the search space size and complexity increases, it would be advantageous to have many nodes per core.

One of the goals of the FFF discussed herein is to configure the core architecture in such a manner as to insure that cores are not idle and that communication distance is minimized. Minimizing communication distance also minimizes energy usage. The arrangement shown in FIG. 5 represents a simple example, where four cores 242, 244, 246, and 248 are connected linearly and each core contains four nodes. If we suppose the maximal length of the procedures was only 4, we can see that such a configuration would be capable of holding in memory only four procedures at any one time. As can be seen in FIG. 5, each core is actively processing one node at a time, so that as many procedures can be evaluated simultaneously as there are cores.

As time progresses, nodes have to be re-allocated for exploration of new pathways. The decision for a core to relocate a node is a relatively simple matter. If the total number of operators available to the node exceeds the number of allocated links, the link with the lowest probability is chosen to represent a new operator. Such an operation may involve the communication of this re-allocation to anterograde nodes, which may reset their routing table probabilities accordingly.

Figure 6:
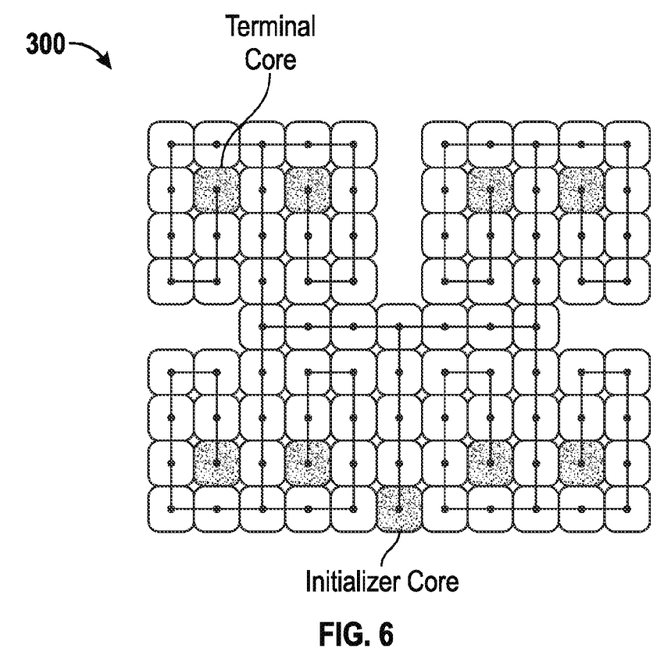
FIG. 6 illustrates a schematic diagram of one possible fractal layout for cores in a layout that emphasizes branching over depth, in accordance with the disclosed embodiments.
Figure 7:
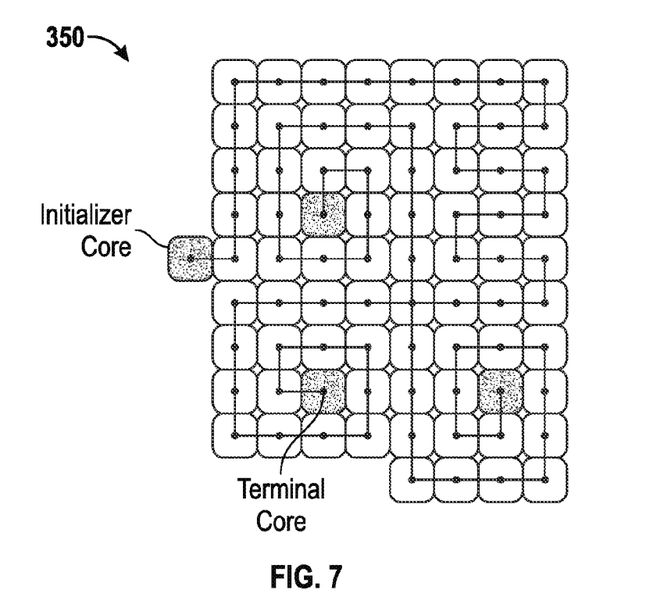
FIG. 7 illustrates a schematic diagram of another possible fractal layout for cores in a layout that emphasizes depth over branching, in accordance with the disclosed embodiments.

As mentioned, the architecture or topology of the cores is important. FIG. 6 illustrates a schematic diagram of one possible fractal layout 300 for cores in a layout that emphasizes branching over depth, in accordance with the disclosed embodiments. FIG. 7 illustrates a schematic diagram of another possible fractal layout 350 for cores in a layout that emphasizes depth over branching, in accordance with the disclosed embodiments.

The core topology is trying to represent within its nodes a number of procedures, which branch out from an initializer core. To accommodate this branching, the core topology itself may be branched (but need not be). Branching of the core topology facilitates the simultaneous evaluation of more paths. Rather than a node picking just one operator and forwarding the result to one node, it may pick two or more, depending on the number of available cores. The layout of this topology is fractal and huge numbers of possible layouts exist. Once such layout is shown in FIG. 6, and another layout is depicted in FIG. 7. A number of important characteristics of the layout are important depending on the type of procedure one is trying to grow. Procedures that are short but can be built of large numbers of operators will favor core layouts with lots of branching. Very long procedures will favor layouts with more depth and less branching. In both cases, layouts that maximally utilize the available cores are preferable.

As the type of procedure one is attempting to evolve changes, the optimal core layout changes. Interestingly, since the layout of the cores can be described through fractal-tree descriptions, which itself is a procedure, it is possible to use the FFF to evolve its own core layout configurations. This is similar to the current state of modern computing, where computers are now used heavily in the design of future computers, bootstrapping designs that would not otherwise be possible.

As may be appreciated at this point, the growth of procedures and the specification of a fractal core layout are very similar to a biological plant. Each plant possesses an intrinsic layout governed by its genetic code. This is what makes two trees of the same species look similar. However, two tree of the same species are most certainly not identical, but rather have adapted within the constraints of their genetic layout. This genetic technique is advantageous, as it allows for a plant to grow into the world with innate "genetic knowledge". On the other hand, one cannot plant tropical plants in Siberia, which is to say the technique will fail if an existing layout adapted for use in one environment is suddenly forced into a new environment.

Figure 8:
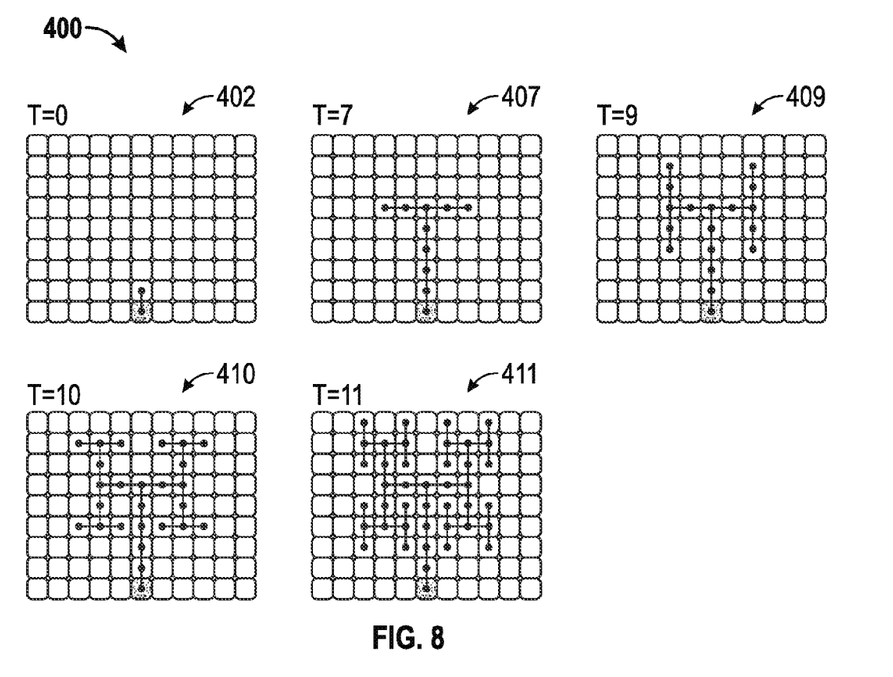
FIG. 8 illustrates a schematic diagram depicting the growth of a core layout during initialization, in accordance with the disclosed embodiments.

In a manner similar to the plant example, a FFF core layout gives the FFF "genetic knowledge" gained from many prior attempts at evolving procedures to solve the same types of problems. Since the FFF can be constructed of cores and may be configured, it is not necessary to hard-wire the layout. On the contrary, it can be appreciated that the ability of an FFF to implement any number of layouts would be a highly advantageous capability. The user can specify the fractal layout as part of the initialization routine, converting a structure-less grid of cores into a specific fractal layout, as can be seen in Illustration 8, which shows the growth of the core layout during initialization.

FIG. 8 illustrates a schematic diagram depicting the growth of a core layout during initialization, in accordance with the disclosed embodiments. Growth is shown at T=0 (i.e., core layout 402), T=7 (i.e., core layout 407), T=9 (i.e., core layout 409), T=10 (i.e., core layout 410), and T=11 (i.e., core layout 411). As can be seen, the core layout can be encoded as a procedure. For example, the following procedure could inform each cell what to do given its depth from initializer node:

FFFFFSFFSFFSFS

"F" above stands for move forward one unit and S stand for "split" and turn. This encoding would equal the total tree depth. There are more efficient encodings, which take advantage of a larger operator space. For example:

F5F2F2F1

FFFFFS has been replaced with F5 or "move forward 5 units then split". It can now be appreciated that such a procedure could, in fact be evolved with Fractal Flow Fabric. The first encoding would favor fractal core layouts with high depth, while the later encoding would favor fractal-core layouts with high branching.

What remains is a method for extracting the grown procedures from the FFF. Recall that backward or retrograde particles are sent from the terminal nodes to the initializer node. These particles represent effective and ineffective procedures. Since communication is energetically expensive, we do not need to send retrograde particles for every procedure. On the contrary, only those really good or really bad procedures need to be remembered by the FFF to bias future growth. Just as the anterograde particles were sent with the packet as it moved from the initializer node to the terminal nodes, retrograde particles can be packaged with retrograde packets that hold the result of the evolved procedure. For the example of the traveling salesman problem, the result is the evolved procedure itself, i.e. the path of cities, along with the total distance. In other problems, significant computation may be undertaken at each step, and the final result may contain significant amount of information.

In such cases, at least three methods may be utilized to reduce the total communication and, in particular, the communication bottle neck at the root node. First, the terminal cores may compress the procedure result before it is sent back to the initializer core. Second, the procedure result may be shipped through another communication pipeline if the core topology allows for it. Third, the result may be buffered at terminal cores for later retrieval. Since the communication of the positive or negative particle is not a communication-intensive operation, the initializer core can simply keep track of the address (which is the evolved procedure). When the grown process is deemed finished, the initializer core may request the procedure result directly by sending a packet up the fractal tree, which responds by sending the result down the fractal tree.

As the preceding discussion has illuminated, reducing the communication burden of the system is important as it will vastly reduce the total consumed power. The ability of FFF to efficiently and quickly grow effective procedures is its main advantage. On method of reducing the total communication burden of the system is to insure that retrograde packet transmission is processed such that only critical information is propagated down the trunck. Retrograde packets contain two pieces of information. First, they contain the evolved procedure, which is equivalent to the fractal address of the terminal node that sends the packet. Second, the packet may contain the procedure result. In the case of the Traveling Salesman problem, this is the total distance traveled. Third, the packet may contain positive or negative particles. To reduce the communication overhead during retrograde packet communication, retrograde packets may be combined. This process involves summing together the packets particles and discarding one procedure. This can be easily understood as in FIG. 9, which illustrates a schematic diagram demonstrating how retrograde packet contents in a procedure 500 can be combined as the packets descend the fractal tree so as to reduce communication bottleneck at the initializer node (e.g., node 102 shown in FIG. 1), in accordance with the disclosed embodiments. Circles 502, 504 and 506 depicted in FIG. 9 generally represent such a situation. In this case, the result of procedure A was greater than the result of procedure B as indicated by expression 503. This would be the case if the procedure was attempting to maximize some quantity.

Figure 9:
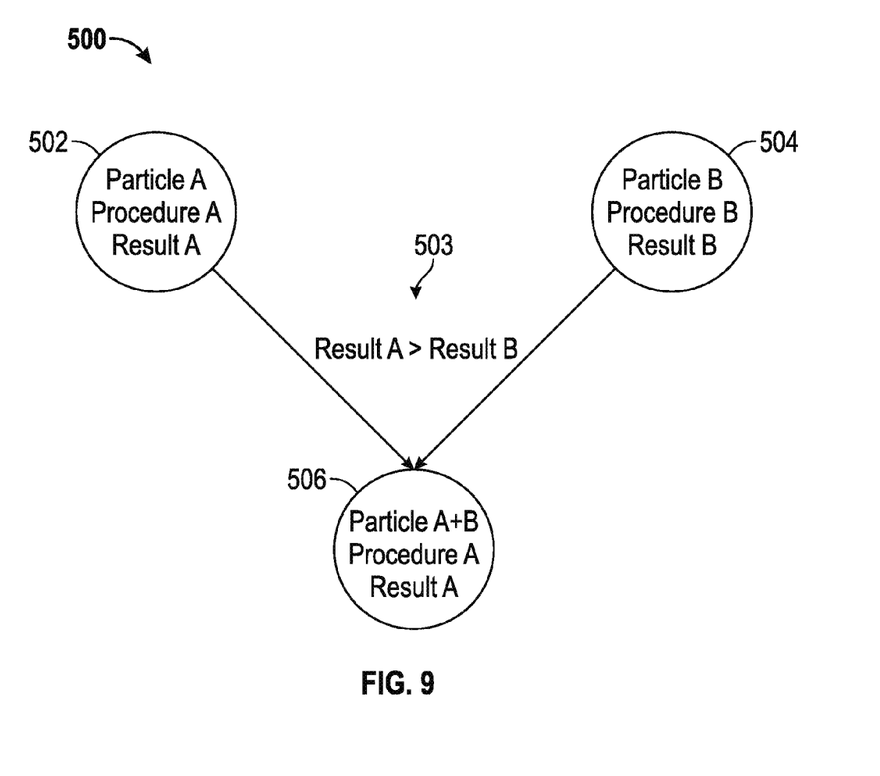
FIG. 9 illustrates a schematic diagram demonstrating how retrograde packet contents can be combined as the packets descend the fractal tree so as to reduce communication bottleneck at the initializer node, in accordance with the disclosed embodiments.

It should be noted that the process of combining packets generally does not alter the performance of the FFF in evolving procedures, since it is the sum of the particles that biases the nodes routing tables.

Based on the foregoing it can be appreciated that a number of embodiments, preferred and alternative, are disclosed herein. For example, in one embodiment, a fractal flow fabric or system can be implemented, which can include a substrate for growing at least one procedure (e.g., one or more procedures), and a plurality of nodes (e.g., one or more nodes) formed on the substrate, wherein each node among the plurality of nodes connects to each other through at least one flow-stabilized link to grow the at least one procedure.

In another embodiment, the nodes can perform a probabilistic routing of data packets along the at least one flow-stabilized link. In yet another embodiment, the at least one flow-stabilized between the nodes can be modified in strength as data packets with positive or negative particles flow over the at least one flow-stabilized link. In still other embodiments, positive particles or negative particles can be emitted in an anterograde direction and proceed up the fractal flow fabric system.

In still another embodiment, positive particles or negative particles can be emitted in a retrograde direction and proceed down the fractal flow fabric system. In yet other embodiments, positive particles or negative particles can be emitted from terminal nodes among the nodes as a result of an evaluation of the at least one procedure. In other embodiments, the substrate can comprise a substrate of cores, wherein each core contains the nodes. In still other embodiments, each core among the substrate of cores can emulate, simulate or functionally represent one node at a time among a larger set of nodes. In other embodiments, the aforementioned substrate of cores can be configured via a growth process that proceeds from an initializer core and proceeds to terminal cores via a fractal tree structure.

In other embodiments, data packets containing a procedure value can be transmitted down the fractal tree structure. In still other embodiments, data packets containing procedure values of the at least one procedure can be averaged at a root core among the substrate of cores. In other embodiments, data packets projecting from a root core among the substrate of cores can include an average solution value. In still other embodiments, positive particles can be emitted from terminal cores among the substrate of cores if a value of an evolved procedure of the at least one procedure exceeds an average solution found. In yet other embodiments, the at least one procedure being evolved can comprise a fractal core configuration with respect to the substrate of cores.

In another embodiment, a fractal flow fabric or system can include, for example, a substrate for growing at least one procedure; and a plurality of nodes formed on the substrate, wherein each node among the plurality of nodes connects to each other through at least one flow-stabilized link to grow the at least one procedure, wherein the plurality of nodes performs a probabilistic routing of data packets along the at least one flow-stabilized link.

In another embodiment, the at least one flow-stabilized link between the nodes among the plurality of nodes can be modified in strength as data packets with positive or negative particles flow over the at least one flow-stabilized link. In another embodiment, positive particles or negative particles can be emitted in an anterograde direction and proceed up the fractal flow fabric system. In still another embodiment, positive particles or negative particles can be emitted in a retrograde direction and proceed down the fractal flow fabric system. In other embodiments, positive particles or negative particles can be emitted from terminal nodes among the plurality of nodes as a result of an evaluation of the at least one procedure. In another embodiment, the substrate can comprise a substrate of cores, wherein each core contains the plurality of nodes.

In still another embodiment, a method of forming a fractal flow fabric, can be implemented. Such a method can include the steps or logical operations of, for example, providing a substrate for growing at least one procedure; forming a plurality of nodes on the substrate; and connecting each node among the plurality of nodes to each other through at least one flow-stabilized link to grow the at least one procedure. In another embodiment, a step can be implemented for configuring the plurality of nodes to perform a probabilistic routing of data packets along the at least one flow-stabilized link. In still another embodiment, the at least one flow-stabilized link between the nodes among the plurality of nodes can be modified in strength as data packets with positive or negative particles flow over the at least one flow-stabilized link.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A fractal flow fabric system, comprising:
a substrate for growing at least one procedure; and
a plurality of nodes formed on said substrate, wherein each node among said plurality of nodes connects to each other through at least one flow-stabilized link to grow said at least one procedure, wherein said at least one flow-stabilized between said nodes among said plurality of nodes are modified in strength as data packets with positive or negative particles flow over said at least one flow-stabilized link.

2. The system of claim 1 wherein said plurality of nodes performs a probabilistic routing of data packets along said at least one flow-stabilized link.

3. The system of claim 1 wherein positive particles or negative particles are emitted in an anterograde direction and proceed up said fractal flow fabric system.

4. The system of claim 1 wherein positive particles or negative particles are emitted in a retrograde direction and proceed down said fractal flow fabric system.

5. The system of claim 1 wherein positive particles or negative particles are emitted from terminal nodes among said plurality of nodes as a result of an evaluation of said at least one procedure.

6. The system of claim 1 wherein said substrate comprises a substrate of cores, wherein each core contains said plurality of nodes.

7. The system of claim 6 where each core among said substrate of cores emulates, simulates or functionally represents one node at a time among a larger set of nodes.

8. The system of claim 6 where said substrate of cores is configured via a growth process that proceeds from an initializer core and proceeds to terminal cores via a fractal tree structure.

9. The system of claim 8 wherein data packets containing a procedure value are transmitted down said fractal tree structure.

10. The system of claim 6 wherein data packets containing procedure values of said at least one procedure are averaged at a root core among said substrate of cores.

11. The system of claim 6 wherein data packets projecting from a root core among said substrate of cores include an average solution value.

12. The system of claim 6 wherein positive particles are emitted from terminal cores among said substrate of cores if a value of an evolved procedure of said at least one procedure exceeds an average solution found.

13. The system of claim 6 wherein said at least one procedure being evolved comprises a fractal core configuration with respect to said substrate of cores.

14. A fractal flow fabric, comprising:
a substrate for growing at least one procedure; and
a plurality of nodes formed on said substrate, wherein each node among said plurality of nodes connects to each other through at least one flow-stabilized link to grow said at least one procedure, wherein said plurality of nodes performs a probabilistic routing of data packets along said at least one flow-stabilized link wherein said at least one flow-stabilized link between said nodes among said plurality of nodes are modified in strength as data packets with positive or negative particles flow over said at least one flow-stabilized link.

15. The fractal flow fabric of claim 14 wherein positive particles or negative particles are emitted in an anterograde direction and proceed up said fractal flow fabric system.

16. The fractal flow fabric of claim 14 wherein positive particles or negative particles are emitted in a retrograde direction and proceed down said fractal flow fabric system.

17. The fractal flow fabric of claim 14 wherein positive particles or negative particles are emitted from terminal nodes among said plurality of nodes as a result of an evaluation of said at least one procedure.

18. A method of forming a fractal flow fabric, comprising:
provided a substrate for growing at least one procedure; and forming a plurality of nodes on said substrate; and connecting each node among said plurality of nodes to each other through at least one flow-stabilized link to grow said at least one procedure, such that said at east one flow-stabilized link between said nodes among said plurality of nodes are modified in strength as data packets with positive or negative particles flow over said at least one flow-stabilized link.

\* \* \* \* \*